Figure 1:
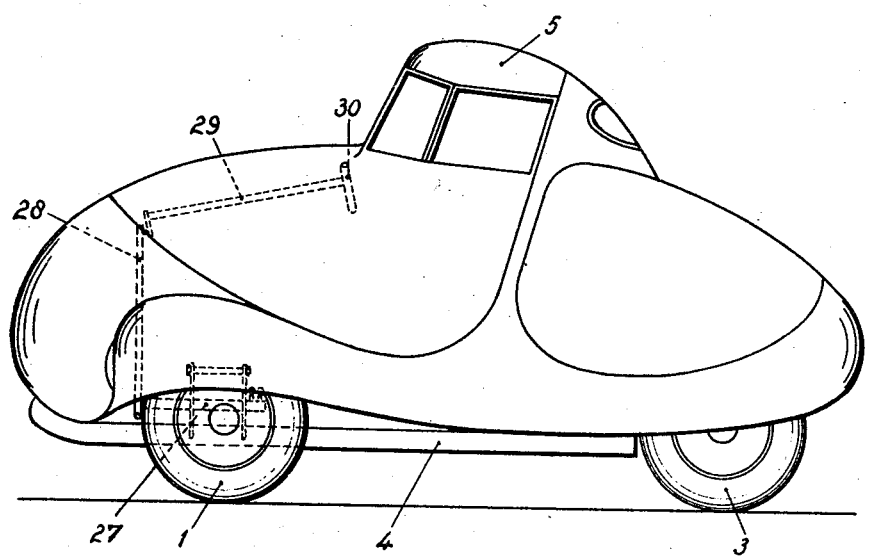

Sept. 12, 1950 M. M. H. LIPS 2,521,986
COMBINATION STEERABLE AND BANKING WHEEL SUSPENSION
Filed July 3, 1946 2 Sheets-Sheet 1

INVENTOR
MAXIMILIAAN M. H. LIPS
BY Young, Emery & Thompson
ATTYS.

Sept. 12, 1950      M. M. H. LIPS      2,521,986
COMBINATION STEERABLE AND BANKING WHEEL SUSPENSION
Filed July 3, 1946      2 Sheets-Sheet 2

INVENTOR
MAXIMILIAAN M. H. LIPS
By Young, Emery & Thompson
ATTYS.

Patented Sept. 12, 1950

2,521,986

UNITED STATES PATENT OFFICE 2,521,986

COMBINATION STEERABLE AND BANKING WHEEL SUSPENSION

Maximiliaan Maria Hendrikus Lips, Drunen, Netherlands

Application July 3, 1946, Serial No. 681,314 In the Netherlands September 9, 1944

Section 1, Public Law 690, August 8, 1946 Patent expires September 9, 1964

2 Claims. (Cl. 280—87)

This invention relates to vehicles of the kind having three or more wheels, at least two of which are located in different planes and serve for steering, the axles of the said wheels being connected to two frame members which are coupled to one another and to the chassis of the vehicle so that they can execute a substantially parallel displacement with respect to the chassis transversely to the longitudinal central plane of the vehicle without becoming locked, in such a manner that the said wheels are inclined in the same sense with respect to the road surface.

Vehicles of the kind referred to have been proposed, the two steering wheels of which are jointly steerable and are prevented from independent movement. Such vehicles are based on bicycle design, having a steering column by means of which the said frame members, together with the steering wheels, are swung round a vertical axis in the manner of a whipple-tree, and while such a vehicle is less inclined to capsize than an ordinary three-wheeled vehicle, it does not have good riding qualities. Further, owing to the frame parts referred to having to be locked to prevent the wheels from becoming inclined at low speeds, the vehicle may not be sufficiently stable when being ridden if the wheel-base is made very narrow, e. g. so narrow that the vehicle can pass through an ordinary door opening.

Bad riding qualities arise for example in the form of long swaying periods which may result in capsizing and the steering is hard. Moreover, when turning a corner, the centre of gravity of the vehicle is lowered, whereby the entire weight of the vehicle has to be raised when returning the steering mechanism to its normal position for travelling in a straight line. Another drawback is that the centre of gravity of the vehicle, particularly when the latter is loaded is on the one hand too high and on the other hand is located too far from the axes of the jointly steerable and inclinable wheels. This cannot be overcome because the known vehicles are provided with a steering column by means of which the wheels are swung around a vertical axis in the manner of a whipple-tree when turning a corner. In the case of a narrow wheel-base, this arrangement does not leave any room for the accommodation of the driver or of other loads or fittings between the wheels in question, so that the centre of gravity of the load is located farther to the rear. The total length available for the accommodation of the driver or of other loads or fittings is thereby further reduced, so that the height of the centre of gravity tends to rise also. Further, the steering motion referred to causes the stability of the vehicle to decrease when rounding a curve by reducing the effective wheel-base. Moreover, a steering head structure soon becomes loose and unreliable and the steering moments are excessive, so that the stability of direction while riding the vehicle is also poor.

A greater drawback, however, is that the plane of the parallelogram carrying the wheels, which is the plane wherein the wheels are inclined, does not remain at right angles to the vertical central longitudinal plane of the vehicle, which has a bad influence on the riding qualities thereof. The result is namely that the rider does not have a proper sense of equilibrium, more particularly since the inclination of the steering column and the vehicle when rounding a curve does not correspond to the inclination of the wheels.

Vehicles of the kind referred to have also been proposed, in which the axles of the steering wheels are pivotally mounted on the said frame members and are coupled to one another so as to swivel jointly around vertical axes located in front of the axles of the said wheels, steering being effected by parallel displacement of the frame members to which the wheel axles are connected by means of mechanism operated by the rider, whereby the wheels swivel automatically by castor action. This arrangement does not promote a proper balance, for which purpose the swivelling of the wheels should be effected without constraint and under the control of the rider as when riding a bicycle, in accordance with the radius of the curve to be rounded and the speed of travel, and not as a result of the tilting of the wheels. Further, there is also the possibility of the wheels swivelling of their own accord and starting to shimmy.

The present invention has for its object to remove the drawbacks above mentioned, and with this object in view, the invention consists in a vehicle of the kind referred to, in which the axles of the steering wheels are pivotally connected to the frame members adapted to execute the parallel displacement in such a manner that the wheels can swivel with respect to the latter, the said axles being operatively connected to a steering control member operated by the driver so as to enable the steering wheels to be swivelled jointly by the said control member for effecting the steering. By this means, not only does the wheel-base remain constant at all times but space between the steering wheels becomes available for accommodating part of the load, so that the position of the centre of gravity is much more favourable.

In carrying out the invention, the seat or seats of the vehicle can be placed in such a manner that the knees of the occupant, when the latter is in a low sitting position, will be located substantially between the wheels.

Figure 2:
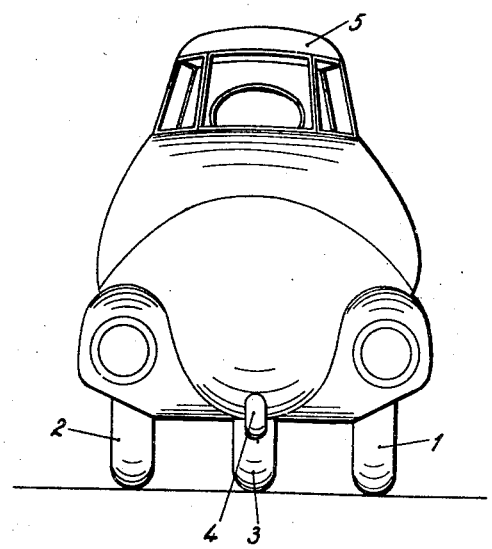
Figure 3:
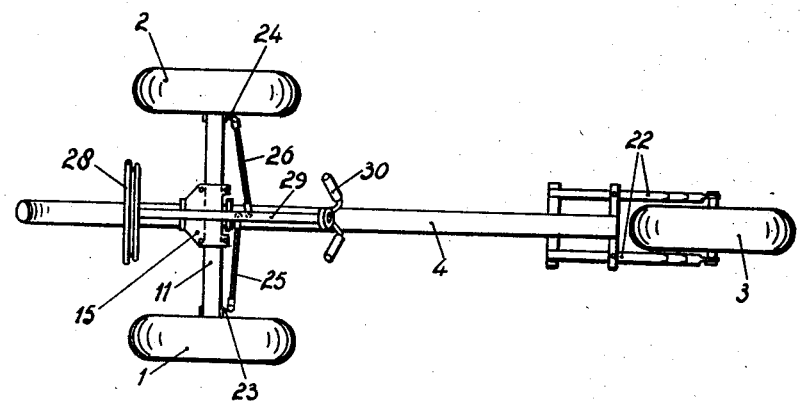
Figure 4:
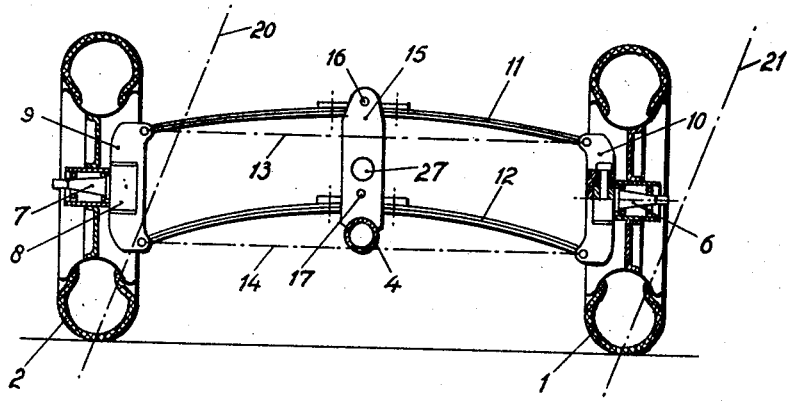

The invention is illustrated by way of example in the accompanying drawings, in which Fig. 1 is a side elevation of a constructional form of a complete vehicle according to the invention, with coachwork, Fig. 2 is a front end view of the vehicle, Fig. 3 is a top plan view of the chassis and Fig. 4 is a front end view of the chassis, partly in transverse section.

Referring to the drawings, the vehicle is supported upon two front wheels 1, 2 and a rear wheel 3 which is driven by a motor (stern motor). The frame of the chassis consists in the main of a central longitudinal tubular member 4 upon which the body is mounted. The body is streamlined with a relatively low front end and rear end and has in the middle a cap 5 provided with glass panes. Preferably access to the vehicle is obtained by constructing it so as to enable the upper part thereof to be opened like a lid.

Each of the wheels 1 and 2 which like the rear wheel 3 are fitted with rubber tyres, turns on an axle 6, 7, respectively, the said axles being ordinary automobile axles with ball bearings. Each of the axles terminates in a vertical bearing socket which encircles a vertical king pin. The king pins form part of upright frame members 9 and 10 which in turn form the upright sides of a parallelogram, the other sides of which are formed as leaf springs 11 and 12. The springs 11 and 12 are slightly cambered. The theoretical sides of the parallelogram are represented by the dotted lines 13 and 14. When the vehicle is loaded the springs 11 and 12 approach these lines.

The springs 11, 12 are pivotally connected at their centres at the points 16 and 17 to a supporting member 15. The ends of the springs 11, 12 are also pivotally connected to the upright frame members 9, 10. The central tubular member 4 of the frame is rigidly connected to the supporting member 15.

When the vehicle is being ridden, the wheels 1 and 2 can assume an inclined position as a result of the parallelogram structure, for instance according to the lines 20 and 21. The supporting member 15 will assume a position parallel to the said lines, so that the body of the vehicle will also become inclined. Consequently the rear wheel 3, which is mounted in the resilient fork 22, will also assume an inclined position. The vehicle is therefore ridden in the manner of a bicycle.

The axles 6 and 7 are provided with arms 23 and 24, being thus constructed as steering swivels as is usual in the case of stub-axle steering heads. The arms 23 and 24 are connected to steering rods 25 and 26 which act in a similar manner to the track rod in the case of the normal steering swivel arrangement. The rods 25, 26 are connected to projections of a steering spindle 27 which is rotatably mounted in the supporting member 15. The steering spindle 27 can be turned with the aid of linkage 28 which is connected to the steering device 29 to which a steering wheel or handles 30 are attached.

What I claim is:

1. A vehicle having at least three wheels, at least two of which are located symmetrically of the longitudinal axis of the vehicle, comprising a pair of opposite members to each of which one of the symmetrically located wheels is connected, a second pair of opposite members which are horizontal members extending in the transverse direction of the vehicle one above the other and pivotally connected in the corners of a parallelogram formed by all four members, a frame member, the second-mentioned members each being pivotally connected in its centre to said frame member so as to cause the said frame member to move parallel with the said wheels transversely to the vertical longitudinal central plane of the vehicle and to and from inclined positions with respect to the road surface, and means for connecting the axles of the two symmetrical wheels to the first mentioned members of the parallelogram for pivotal movement about an upright axis to permit swivelling of the wheels for steering purposes, the said axles being operatively connected to a steering control mechanism to enable a joint swivelling steering motion.

2. A vehicle according to claim 1, in which the second-mentioned members of the parallelogram are each leaf spring members.

MAXIMILIAAN MARIA HENDRIKUS LIPS.

REFERENCES CITED

The following references are of record in the file of this patent:

UNITED STATES PATENTS

| Number | Name | Date |
|---|---|---|
| 1,538,494 | Tucker | May 19, 1925 |
| 1,989,995 | Martin | Feb. 5, 1935 |